(12) United States Patent
Deardurff

(10) Patent No.: US 6,730,151 B2
(45) Date of Patent: May 4, 2004

(54) INK JET DYE DESIGN

(75) Inventor: Larrie A Deardurff, Corvalis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 10/057,692

(22) Filed: Jan. 25, 2002

(65) Prior Publication Data

US 2003/0167966 A1 Sep. 11, 2003

(51) Int. Cl.[7] ............ C09D 11/02; B41J 2/01; C07D 231/44
(52) U.S. Cl. ............ 106/31.49; 347/100; 548/367.7; 548/374.1
(58) Field of Search ............ 106/31.49; 347/100; 548/367.7, 374.1

(56) References Cited

U.S. PATENT DOCUMENTS

| | | | |
|---|---|---|---|
| 5,214,164 A | 5/1993 | Drexhage et al. | 549/405 |
| 5,242,785 A | 9/1993 | Morigaki et al. | 430/505 |
| 5,294,527 A | 3/1994 | Deguchi | 430/545 |
| 5,324,626 A | 6/1994 | Shono et al. | 430/503 |
| 5,446,142 A | 8/1995 | Itoh et al. | 540/139 |
| 5,604,004 A | 2/1997 | Suziki et al. | 428/641 |
| 5,610,003 A | 3/1997 | Lussier | 430/555 |
| 5,714,993 A | 2/1998 | Keoshkerian et al. | 347/95 |
| 5,804,530 A * | 9/1998 | Eguchi et al. | 503/227 |
| 5,827,638 A | 10/1998 | Tsukahara et al. | 430/505 |
| 5,830,627 A | 11/1998 | Nakai et al. | 430/505 |
| 5,858,628 A * | 1/1999 | Yoshida et al. | 430/338 |
| 5,985,453 A | 11/1999 | Moriya et al. | 428/411.1 |
| 6,063,729 A * | 5/2000 | Eguchi et al. | 503/227 |
| 6,494,942 B1 * | 12/2002 | Deardurff et al. | 106/31.43 |
| 2002/0032252 A1 * | 3/2002 | Ishizuka | 523/160 |

* cited by examiner

Primary Examiner—Helene Klemanski

(57) ABSTRACT

Magenta chromophore dyes which are stabilized by adding steric hindering groups to protect the imino carbons; non-limiting examples of the steric hindering groups being phenyl, methyl, ethyl, isopropyl, fluoride, chloride, bromide and iodide groups.

13 Claims, No Drawings

INK JET DYE DESIGN

FIELD OF THE INVENTION

The present invention generally relates to ink-jet printing, and in particular to a specific dye and ink sets for improving ink-jet print stability.

BACKGROUND OF THE INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers. Notwithstanding their recent success, intensive research and development efforts continue toward improving ink-jet print quality. A surge in interest in ink-jet printing has resulted in the need to produce high quality prints at a reasonable cost. The challenge remains to further improve the print quality and lightfastness of ink-jet prints. The emerging use of ink-jet prints for digital photos, requires high-resolution images that have accurate color and are durable.

Manufacturers of photographic film and print media have come up with dyes reported to have a display life of up to 60 years. A search of patents by Fuji revealed that they have developed a class of dyes, which when used in photographic media, are very stable. However, this class of dyes has been found not to be very stable toward light. Lightfastness is a very important quality in a dye used in ink-jet printing. Further, it is known that these azopyrazolone dyes can be attacked by ozone at the imine carbon. These shortcoming of such known photographic dyes, especially in the magenta and magenta-containing colors, make them unsuitable for use in ink-jet printing.

Accordingly, investigations continue into developing ink formulations which have improved properties and which do not improve one property at the expense of the others. Thus, there remains a need in the art to further improve the print quality, color gamut, and lightfastness of the ink-jet prints without sacrificing pen performance and reliability, particularly when trying to reproduce the color gamut of silver halide prints.

SUMMARY OF THE INVENTION

The present invention relates to a magenta ink for ink-jet printing, comprising a dye having a structure as follows:

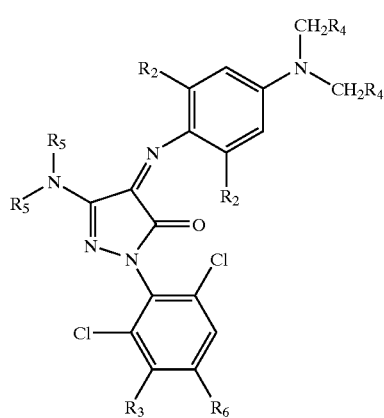

R2 is selected from the group consisting of methyl, ethyl, propyl, isopropyl and halogen;

R3 is selected from the group consisting of H, $SO_3H$, COOH, and a polyether group

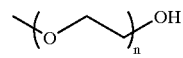

where n is from 2 to 100;

R4 is selected from the group consisting of H, $SO_3H$, COOH, $CH_2SO_3H$, $CH_2COOH$, $C_2H_4SO_3H$ and $C_2H_4COOH$;

R5 is selected from the group consisting of ethyl, propyl, isopropyl, phenyl, substituted phenyl and R4; and R6 is selected from the group consisting of H, halogen, methyl, amino, substituted amino, R4 and R3.

The present invention also relates to a magenta ink for ink-jet printing, comprising a dye having the following structure:

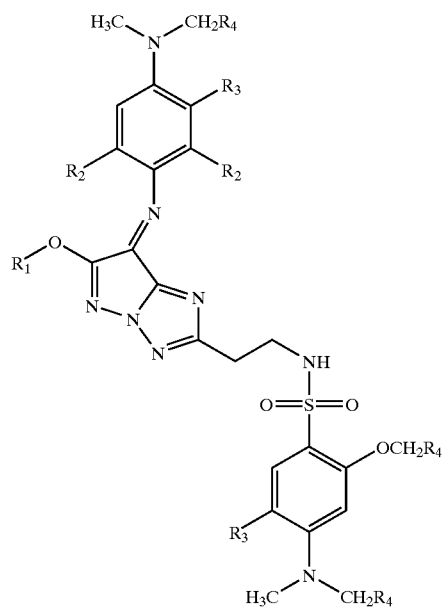

wherein R1 is selected from the group consisting of ethyl isopropyl, isobutyl, phenyl and substituted phenyl;

R2 is selected from the group consisting of methyl, ethyl, propyl, isopropyl and halogen;

R3 is selected from the group consisting of H, $SO_3H$, COOH, and a polyether group

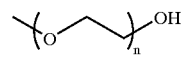

where n is from 2 to 100; and

R4 is selected from the group consisting of H, $SO_3H$, COOH, $CH_2SO_3H$, $CH_2COOH$, $C_2H_4SO_3H$ and $C_2H_4COOH$.

In addition the present invention relates to a magenta ink for ink-jet printing, comprising a dye having the following structure:

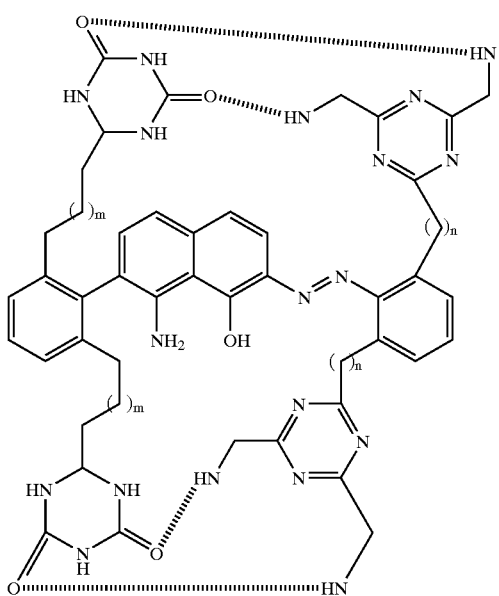

wherein m and n are from 0 to 4 added carbons.

Furthermore the present invention relates to a magenta ink for ink-jet printing comprising a dye having the following structure:

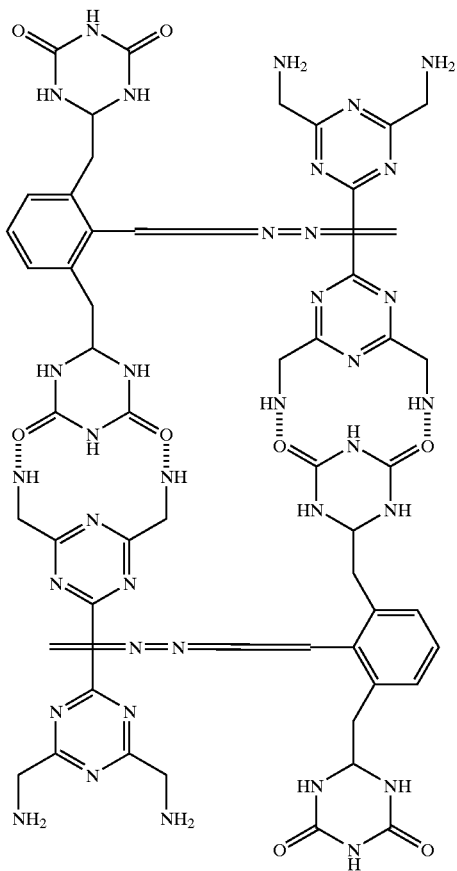

wherein  is an azo dye structure

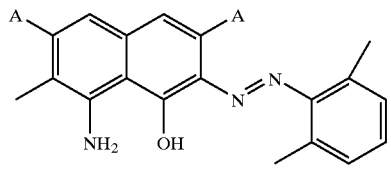

wherein A is selected from H and $SO_3H$, or a gamma acid based dye structure

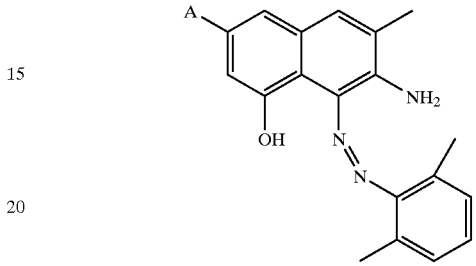

wherein A is selected from H and $SO_3H$.

The present invention also relates to a method for ink-jet printing, comprising:
providing at least one magenta ink containing at least one magenta dye having a visible light absorbance of 0.01 to 0.57 at $lambda_{max}$ at a 1:10,000 dilution in water and having a structure as follows:

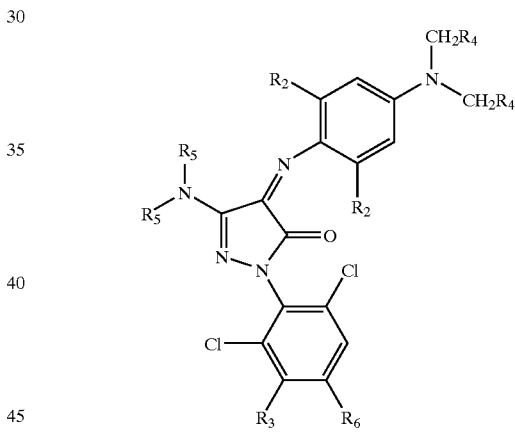

R2 is selected from the group consisting of methyl, ethyl, propyl, isopropyl and halogen;
R3 is selected from the group consisting of H, $SO_3H$, COOH, and a polyether group

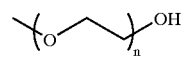

where n is from 2 to 100;
R4 is selected from the group consisting of H, $SO_3H$, COOH, $CH_2SO_3H$, $CH_2COOH$, $C_2H_4SO_3H$ and $C_2H_4COOH$;
R5 is selected from the group consisting of ethyl, propyl, isopropyl, phenyl, substituted phenyl, and R4; and
R6 is selected from the group consisting of H, halogen, methyl, amino, substituted amino, R4 and R3; and
printing said ink on a printing medium by means of an ink-jet pen.

In addition the present invention relates to a method for ink-jet printing, comprising: providing at least one magenta ink containing at least one magenta dye having a visible light absorbance of 0.01 to 0.57 at $lambda_{max}$ at a 1:10,000 dilution in water and having a structure as follows:

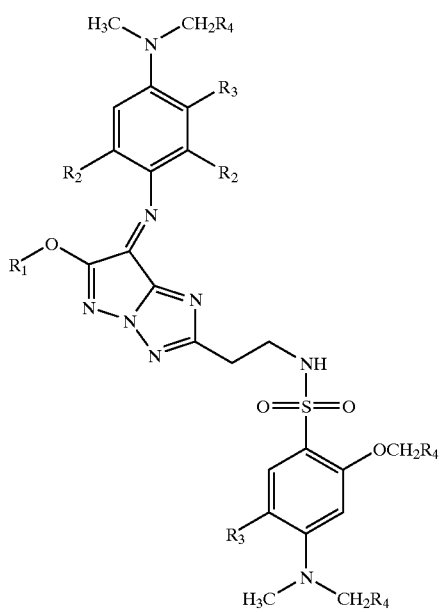

wherein R1 is selected from the group consisting of ethyl isopropyl, isobutyl, phenyl and substituted phenyl;
R2 is selected from the group consisting of methyl, ethyl, propyl, isopropyl and halogen;
R3 is selected from the group consisting of H, $SO_3H$, COOH, and a polyether group

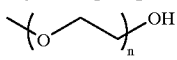

where n is from 2 to 100; and
R4 is selected from the group consisting of H, $SO_3H$, COOH, $CH_2SO_3H$, $CH_2COOH$, $C_2H_4SO_3H$ and $C_2H_4COOH$; and
printing said ink on a printing medium by means of an ink-jet pen.

Furthermore, the present invention relates to a method for ink-jet printing, comprising:
providing at least one magenta ink containing at least one magenta dye having a visible light absorbance of 0.01 to 0.57 at lambda$_{max}$ at a 1:10,000 dilution in water and having a structure as follows:

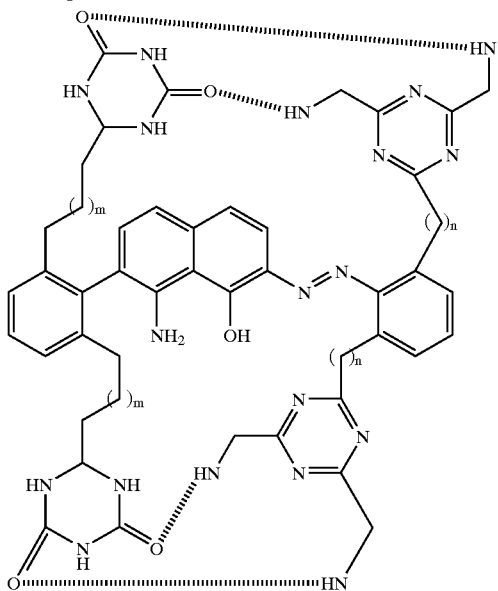

wherein m and n are from 0 to 4 added carbons; and printing said ink on a printing medium by means of an ink-jet pen.

Additionally the present invention relates to a method for ink-jet printing, comprising:

providing at least one magenta ink containing at least one magenta dye having a visible light absorbance of 0.01 to 0.57 at lambda$_{max}$ at a 1:10,000 dilution in water and having a structure as follows:

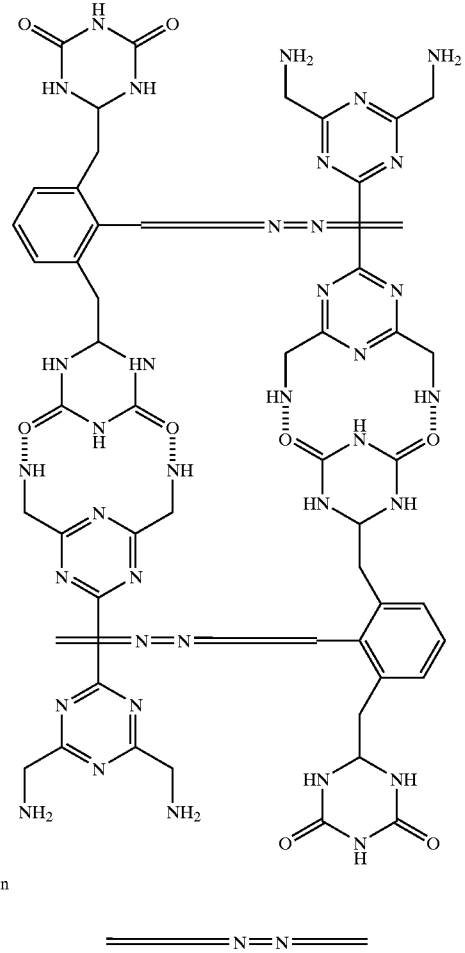

wherein $$=\!=\!=\!N\!=\!N\!=\!=\!=$$

is an azo dye structure

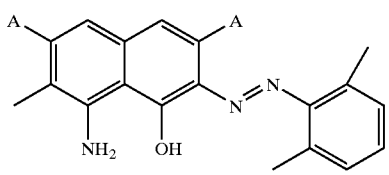

wherein A is selected from H and SO$_3$H,
or a gamma-acid based dye structure

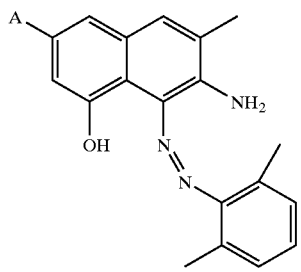

wherein A is selected from H and SO$_3$H; and
printing said ink on a printing medium by means of an ink-jet pen.

Also the present invention relates to a method of stabilizing chromophore dyes containing imino groups, the imino groups selected from the group consisting of imino groups A and B:

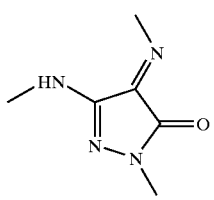

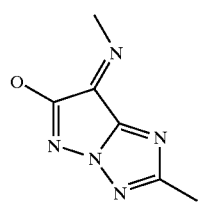

the method comprising adding steric groups to protect imino carbons, the steric groups being selected from phenyl, methyl, ethyl, isopropyl, fluoride, chloride, bromide and iodide.

Furthermore, the present invention relates to a method of stabilizing chromophore dyes comprising arms ending in at least one of cyanuric and melamine groups:

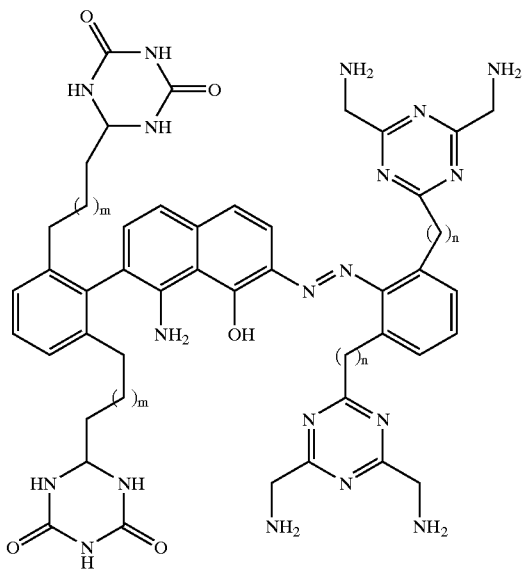

wherein m and n are from 0 to 4 added carbons.

the method comprising forming intramolecular hydrogen bonds between the cyanuric and melamine groups:

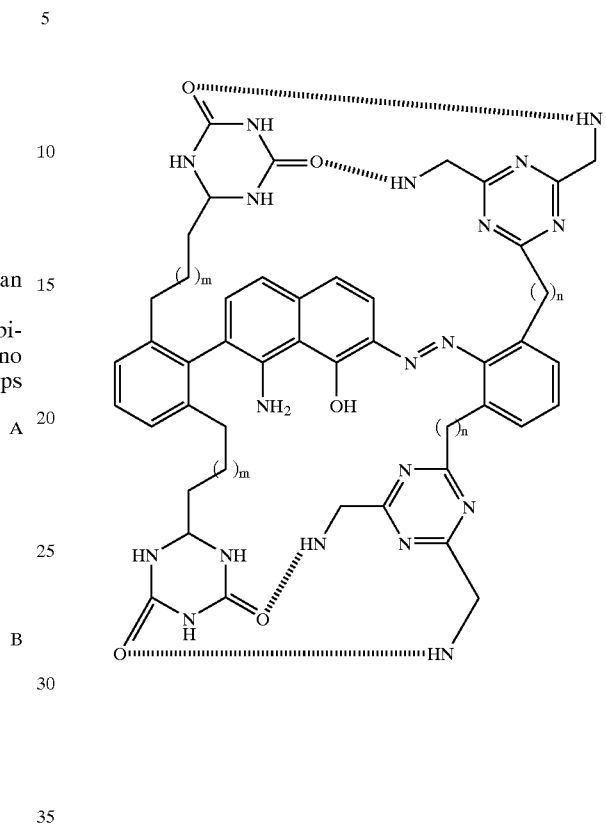

wherein m and n have from 0 to 4 added carbons.

Also, the present invention relates to a method of stabilizing chromophore dyes with one of the following structures comprising arms ending in at least one of cyanuric and melamine groups:

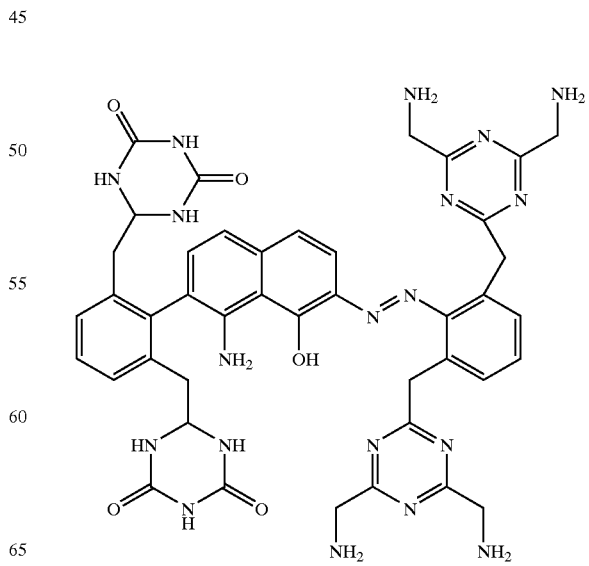

-continued

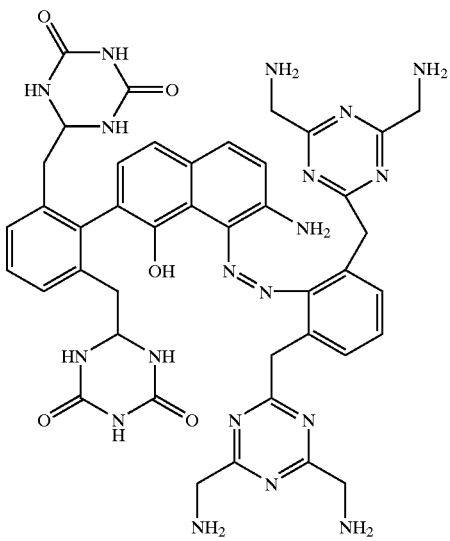

the method comprising forming intermolecular hydrogen bonds between the cyanuric and melamine groups of two different dye molecules:

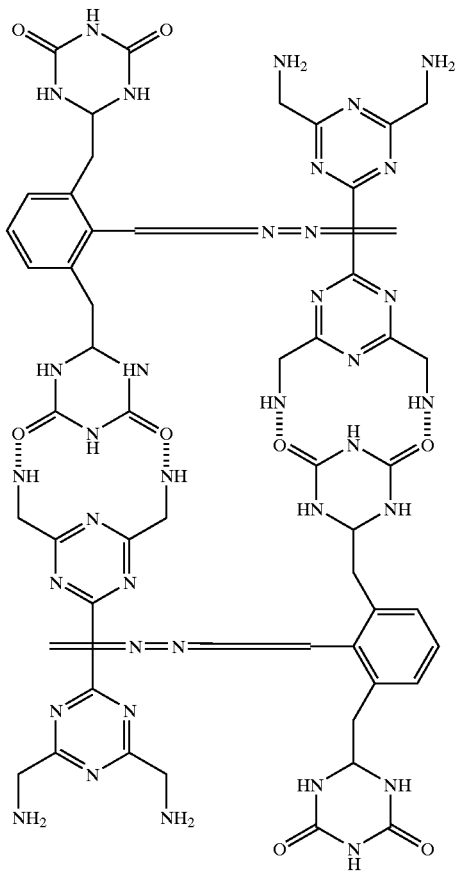

wherein

is an azo dye structure

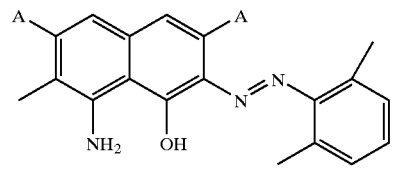

wherein A is selected from H and $SO_3H$ or a gamma acid based dye structure

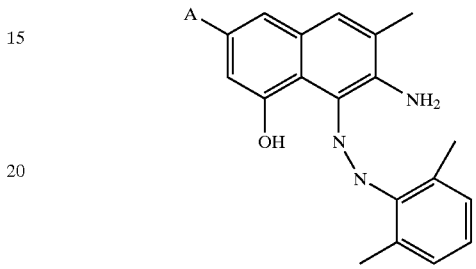

wherein A is selected from H and $SO_3H$.

DETAILED DESCRIPTION OF THE INVENTION

The invention described herein is directed to dyes for use with commercially available ink-jet printers such as Design Jet® liner printers, manufactured by Hewlett-Packard Company, of Palo Alto, Calif. More specifically, a specific dye for formulating the magenta is disclosed. The dye enables the production of high-quality print and excellent lightfastness. The inks formulated according to the invention produce images having color appearance that meets commercial requirements for color accuracy and durability.

One of the most stable photographic systems on the market today is Fuji film and print media, which is reported to have a display life of 60 years. A search of patents by Fuji revealed that they have developed a novel class of dyes, which when used in photographic media, were very stable. Structures 1 and 2 are examples of such dyes:

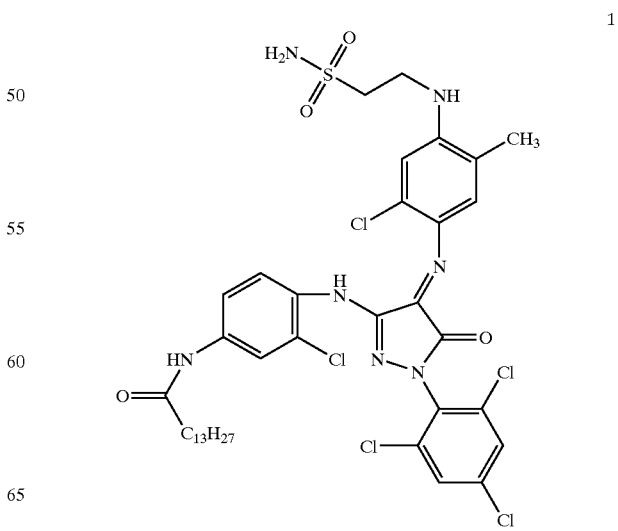

1

2

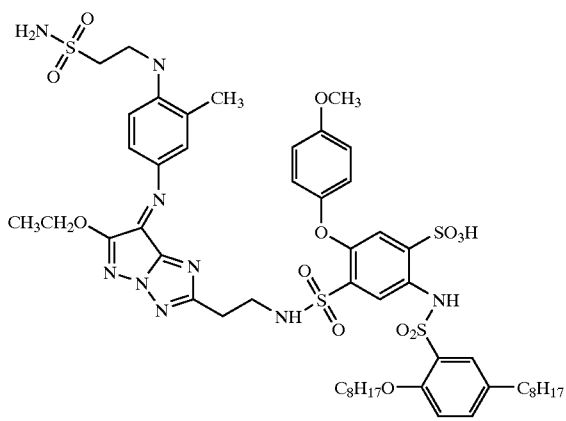

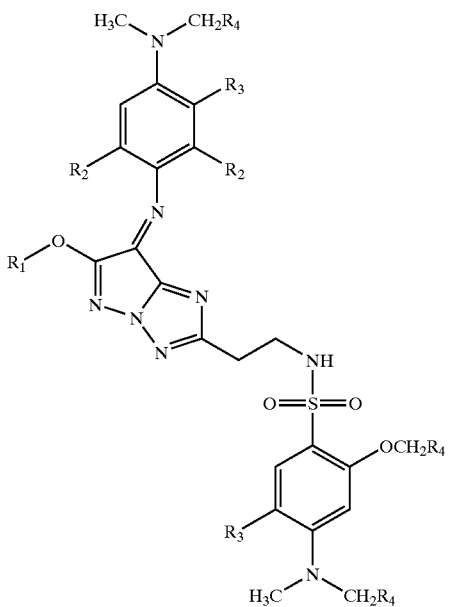

Recognizing that the environment around the dye plays a very large role in dye stability, HP isolated the magenta dye from developed Fuji Crystal Archive photographic media and investigated its stability on a typical glossy ink jet medium. It was found not to be very stable toward light. Further, it is known that these azopyrazolone dyes can be attacked by ozone at the imine carbon. Thus, at first glance, this class of dye does not appear to be very interesting from an ink jet application standpoint. However, given that the chemistry of this class of dye is well known and it has a very good color, it is an excellent choice to pursue the concept of steric protection.

If all of the large "ballast" groups are stripped away that are present in typical photographic dyes to leave the basic chromophore and attach groups to provide steric protection of the imine carbon, the dyes shown in Structures 3 and 4 are produced.

3

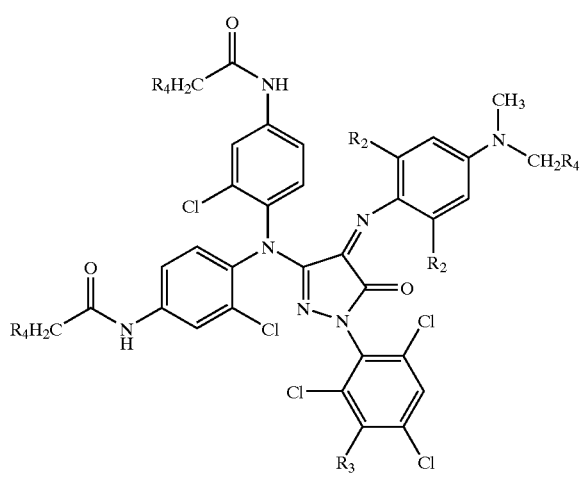

In structure 3, the phenyl group attached to the imino N at C-4 has ortho-methyl groups, which will inhibit formation of tetrahedral N. Similarly, the C-5 nitrogen has two phenyl groups with ortho chlorines attached to make approach to C-5 more difficult. In an analogous manner, the azopyrasolotriazole dye (structure 2) has been modified to produce structure 4. In addition to the same ortho-methyl groups on the imino phenyl ring, oxygen at C-8 has an isopropyl instead of an ethyl group.

Molecular modeling (Hyperchem) of structure 3 shows that the approach to the imine carbon (or to the entire pyrazolone ring) is very hindered. Structure 1 shows the energy minimized structure.

A remaining challenge is to make these dyes water-soluble. Two options appear likely. One is to sulfonate one or more of the aromatic rings. Second is to change the acetamide groups to contain a water-solubilizing group, such as COOH, $SO_3H$, or polyether.

Further, it has been reported that spiroindane compounds when added to solutions of these dyes improve their light-fastness. It is speculated that the spiro materials act as singlet excited state quenchers. Thus, similar type additives could be added to these dyes either in the ink or in the media itself. Such work is the subject of a recent patent application by the same inventor, Ser. No. 09/662,950 filed on Sep. 15, 2000.

Another approach to providing steric protection of dyes is to encase them inside some structure. One method of doing this is to construct bridges that cross over above and below the imine or azo plane. However, synthetically, such structures are very challenging to make. An alternate method of doing this is to use the concept of "self-assembly". In this approach, the dye is constructed so that it contains arms that spontaneously form bridge like structures. This area of chemistry is extensive and recently reviewed. The driving force to make the bridge structure is the formation of several hydrogen bonds, although other methods such as metal chelation are also possible.

Using a prototypical acid azo dye, complementary arms can be attached so that they form hydrogen bonds with each other. This process forms the protecting bridge. Such a structure is shown in structure 5, where the cyanuric and melamine groups can form H-bonds to each other above and below the plane of the naphthalene ring. This effectively "encapsulates" the dye. Space filling models (HGS) show that this arrangement is possible.

is an azo dye structure

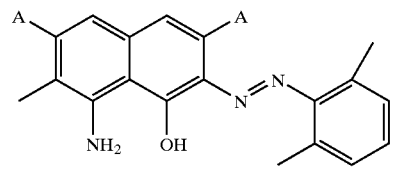

wherein A is selected from H and SO$_3$H,
or a gamma acid based dye structure

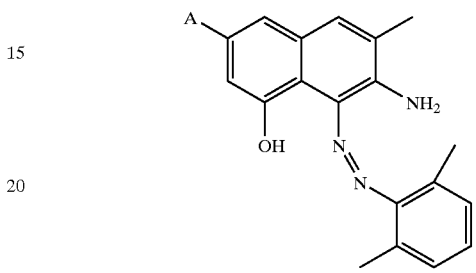

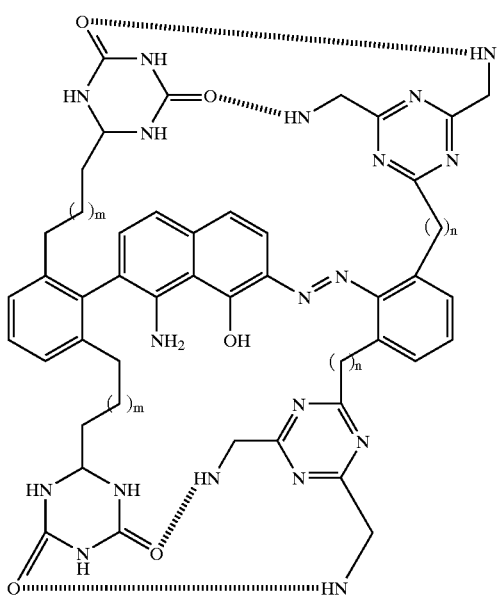

wherein m and n are from 0 to 4 added carbons.

An alternate approach to this methodology is to shorten the alkyl chains that attach the cyanuric acid groups. This precludes intra-molecular H-bonding to the melamine group, but allows inter-molecular H-bonding. A head to tail stacking of the dye molecules then results. This enforced aggregation of the dye protects the dye for obvious steric reasons. Further, dye aggregation has been shown to improve light stability. This stacked structure is shown in Structure 6.

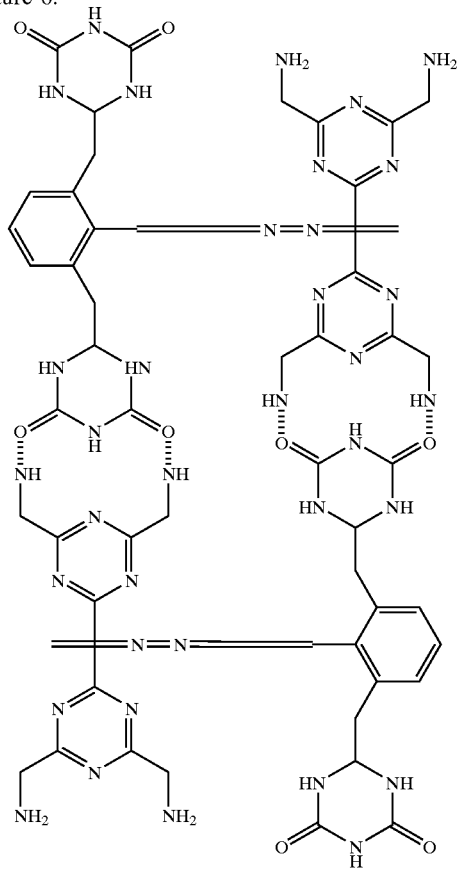

wherein $=\!=\!=\!\text{N}=\text{N}=\!=\!=$

wherein A is selected from H and SO$_3$H.

The present magenta aqueous ink compositions each comprise in general from about 0.1 to about 6 wt % of at least one dye, and a vehicle comprising the following components (in wt % of total ink composition): from about 5 to about 30 wt % of at least one organic solvent; 0 to about 2.0 wt % of at least one component independently selected from the group consisting of surfactants, buffers, biocides, and metal chelators; and the balance water.

A preferred embodiment of the magenta aqueous ink comprises a dye having a structure as follows:

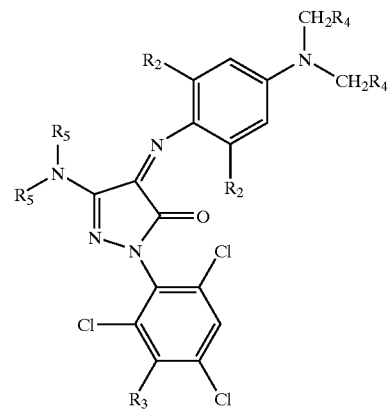

R2 is selected from the group consisting of methyl, ethyl, propyl, isopropyl and halogen; R3 is selected from the group consisting of H, SO$_3$H, COCH, and a polyether group

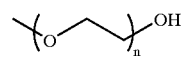

where n is from 2 to 100; R4 is selected from the group consisting of SO$_3$H, COCH, CH$_2$SO$_3$H, CH$_2$COOH, C$_2$H$_4$SO$_3$H and C$_2$H$_4$COOH; R5 is selected from the group consisting of ethyl, propyl, isopropyl, phenyl, substituted phenyl, and R4; and R6 is selected from the group consisting of H, halogen, methyl, amino, substituted amino, R4 and R3. In a more preferred embodiment, the above magenta aqueous ink comprises from about 0.5 to about 6 wt % dye. In a yet more preferred embodiment, the above magenta aqueous ink comprises from about 0.5 to about 4 wt % dye.

All concentrations herein are in weight percent of total ink composition unless otherwise indicated. The purity of all components is that employed in normal commercial practice for ink-jet inks.

Vehicle

The inks of the present invention comprise an aqueous vehicle comprising the following components (in wt % of total ink composition): from about 5 to about 30 wt % of at least one water soluble organic solvent; 0 to about 2.0 wt % of at least one component independently selected from the group consisting of surfactants, buffers, biocides, and metal chelators; and the balance water.

Organic Solvent

The inks of the present invention comprise from about 5 to about 30 wt % organic solvent. More preferably, the inks comprise from about 8 to about 20 wt % organic solvent, with a concentration from about 9 to about 15 wt % being the most preferred. The water soluble organic solvents suitably employed in the present ink-jet ink compositions include any of, or a mixture of two or more, of such compounds as nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols, (e.g., 1,2-ethandiol), propanediols (e.g., 1,2-propanediol, 1,3-propanediol, 2-ethyl-2-hydroxymethyl-1,3-propanediol, ethylhydroxy-propanediol (EHPD), butanediols (e.g., 1,2-butanediol, 1,3-butanediol, 1,4-butanediol), pentanediols (e.g., 1,2-pentanediol, 1,5-pentanediol), hexanediols (e.g., 1,6-hexanediol, 2,5-hexanediol, 1,2-hexanediol), heptanediols (e.g., 1,2-heptanediol, 1,7-heptanediol), octanediols (e.g., 1,2-octanediol, 1,8-octanediol); glycols and thioglycols, commonly employed in ink-jet inks, such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol; and glycol ethers such as dipropylene glycol monobutyl ether, propylene glycol monobutyl ether, and ethylene glycol monobutyl ether, diethylene glycol monohexyl ether.

Surfactant

The inks of the present invention optionally comprise 0 to about 2.0 wt % surfactant. More preferably, the inks comprise from about 0.1 to about 1.8 wt % surfactant, with a concentration from about 0.8 to about 1.5 wt % being the most preferred. In the practice of the invention, one or more surfactants may optionally be used. Non-ionic surfactants, such as secondary alcohol ethoxylates (e.g., Tergitol series available from Union Carbide Co.), non-ionic fluoro surfactants (e.g., FC170C available from 3M, non-ionic fatty acid ethoxylate surfactants (e.g., Alkamul PSMO-20 available from Rhone-Poulenc), non-ionic silicone surfactants (e.g., SilwetL7600 available from Osi Specialties, Inc. Danbury, Conn.), and fatty amide ethoxylate surfactants (e.g., Aldamide L203 available from Rhone-Poulenc) are preferred, with secondary alcohol ethoxylates being the most preferred. In the practice of the invention, the surfactant serves to prevent color to color bleed by increasing the penetration of the inks into the print medium, and to improve the spread of the ink on polymer coated media. Secondary alcohol ethoxylates are nonionic surfactants and are commercially available, for example, from Union Carbide Co. (Houston, Tex.) as the Tergitol series, such as Tergitol 15-S-5 and Tergitol 15-S-7.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have from about 12 to about 18 carbon atoms in the aliphatic chain, while the number of ethoxylated units is predominantly in the range of from about 4 to about 8 units. Thus, "Tergitol 15-S-5" represents a secondary alcohol ethoxylate surfactant predominantly having about 15 carbons in its aliphatic chain and about 5 ethoxylated units. Tergitol 15-S-5 and Tergitol 15-S-7 are the preferred surfactants.

Buffer

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred. Buffers employed in the practice of the invention to modulate pH can be organic-based biological buffers or inorganic buffers, preferably, organic-based. Further, the buffers employed should maintain a pH ranging from about 3 to about 9 in the practice of the invention, preferably about 6.5 to about 8 and most preferably from about 7.5 to 8.5. Examples of preferably-employed buffers include Trizma Base, available from companies such as Aldrich Chemical (Milwaukee, Wis.), 4-morpholineethanesulfonic acid (MES), b-hydroxy-4-morpholinepropanesulfonic acid (MOPSO), and 4-morpholinepropanesulfonic acid (MOPS).

Metal Chelator

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Metal chelators employed in the practice of the invention are used to bind transition metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind transition metal actions. More preferably, EDTA, and DTPA; and most preferably EDTA in its disodium salt form is employed in the practice of the invention.

Biocide

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred. Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide. The specific ink set disclosed herein is expected to find commercial use in ink-jet color printing.

EXAMPLES

Example 1

A pyrazolone azomethine dye dye of the present invention, is synthesized as shown below:

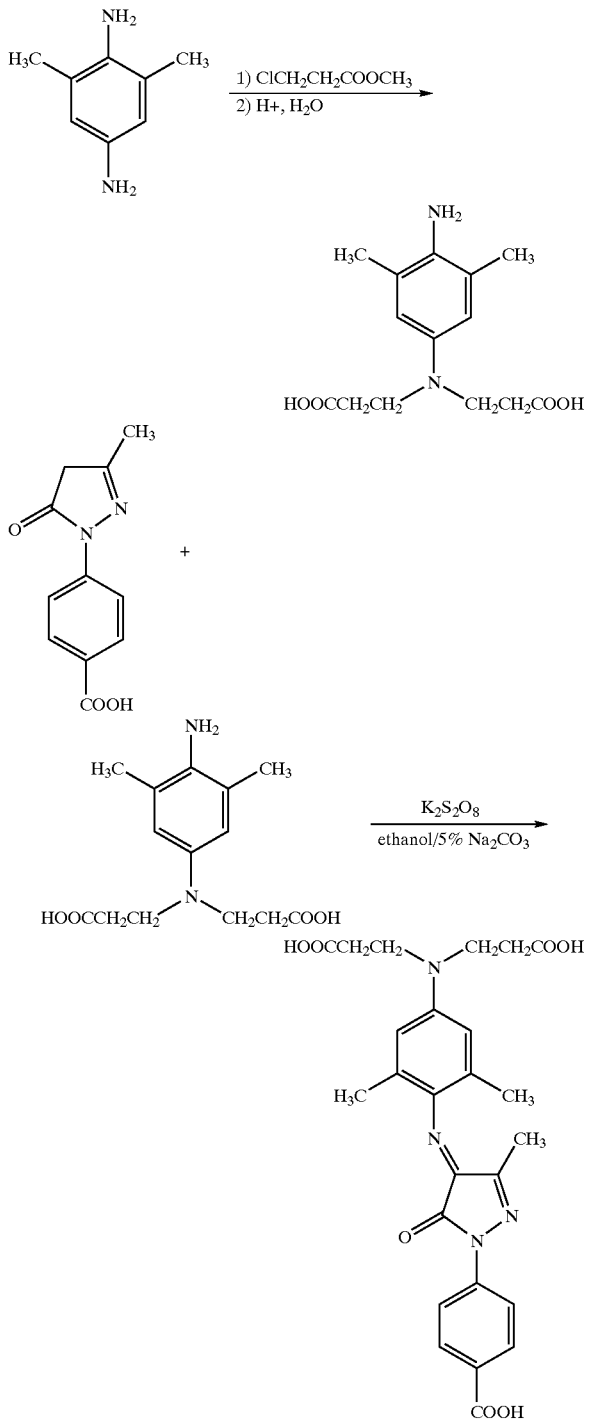

The desired hindered phenylenediamine is made by treating 2,5-dimethyl-1,4-phenylenediamine with methyl-3-chloropropananate and hydrolyzing the resulting ester to the acid. In the above formula, the pyrazolone azomethine dye [4-(3-methyl-4-)4-(N,N-di-(ethylsulfonic acid)amino)-1-phenylimino)-5-oxo-2-pyrazolin-yl)-benzoic acid] was prepared by adding 0.6 grams of potassium persulfate to a stirred mixture of 4-(3-methyl-5-oxo-2-pyrazolin-1-yl)-benzoic acid (1 mmol), N,N-di-ethylsulfonic acid)-1,4-phenylenediamine (0.25 g), methanol (10 mL), and sodium carbonate in water (5%; 20 mL). The mixture was stirred for about 40 minutes and then additional water (70 mL) was added. The pyrazolone azomethine dye was collected by filtration, dried and recrystallized with methanol or ethanol.

What is claimed is:

1. A magenta ink for ink-jet printing, comprising a water-soluble dye having a structure as follows:

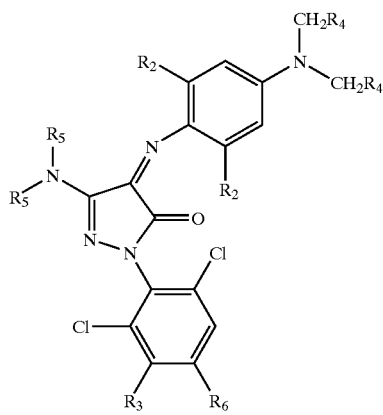

R2 is selected from the group consisting of methyl, ethyl, propyl, isopropyl and halogen;

R3 is selected from the group consisting of $SO_3H$, COOH, and a polyether group

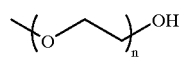

where n is from 2 to 100;

R4 is selected from the group consisting of H, $SO_3H$, COOH, $CH_2SO_3H$, $CH_2COOH$, $C_2H_4SO_3H$ and $C_2H_4COOH$;

R5 is selected from the group consisting of ethyl, propyl, isopropyl, phenyl, substituted phenyl, and R4; and R6 is selected from the group consisting of H, halogen, methyl, amino, substituted amino, R4 and R3.

2. A magenta ink according to claim 1, wherein the water-soluble dye has a structure as follows:

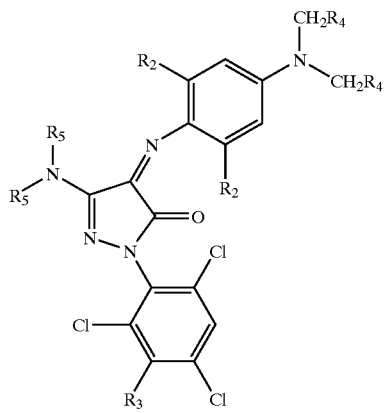

R2 is selected from the group consisting of methyl, ethyl, propyl, isopropyl and halogen;

R3 is selected from the group consisting of SO$_3$H, COOH, and a polyether group

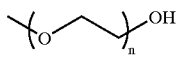

where n is from 2 to 100;

R4 is selected from the group consisting of H, SO$_3$H, COOH, CH$_2$SO$_3$H, CH$_2$COOH, C$_2$H$_4$SO$_3$H and C$_2$H$_4$COOH; and R5 is selected from the group consisting of ethyl, propyl, isopropyl, phenyl, substituted phenyl, and R4.

3. A magenta ink according to claim 1, wherein the water-soluble dye has a structure as follows:

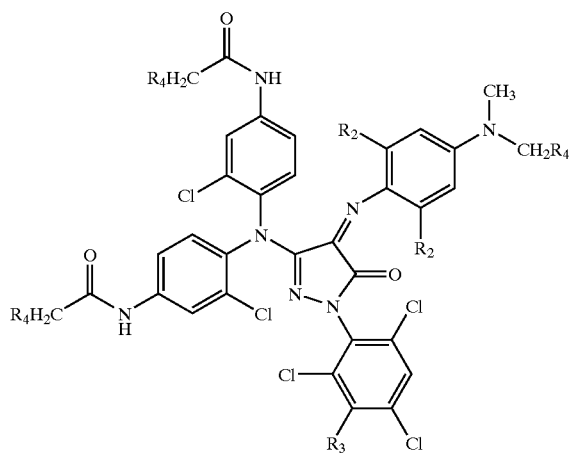

wherein R2 is selected from the group consisting of methyl, ethyl, propyl, isopropyl and halogen;

R3 is selected from the group consisting of SO$_3$H, COOH, and a polyether group

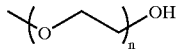

where n is from 2 to 100; and

R4 is selected from the group consisting of SO$_3$H, COOH, CH$_2$SO$_3$H,

CH$_2$COOH, C$_2$H$_4$SO$_3$H and C$_2$H$_4$COOH.

4. A magenta ink according to claim 1, wherein the water-soluble dye has a structure as follows:

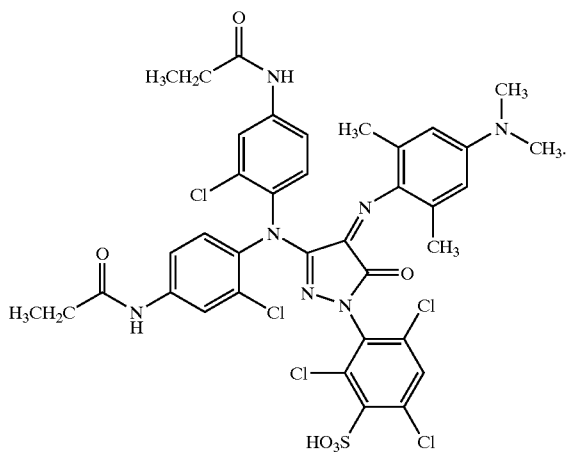

5. The magenta ink of claim 1 wherein said magenta ink comprises from about 0.1 to about 6 wt % dye.

6. The magenta ink of claim 5 wherein said magenta ink comprises from about 0.5 to about 6 wt % dye.

7. The magenta ink of claim 6 wherein said magenta ink comprises from about 0.5 to about 4 wt % dye.

8. The ink of claim 1 further comprising:

about 5 to about 30 wt % of at least one organic solvent;

0 to about 2.0 wt % of at least one component independently selected from the group consisting of surfactants, buffers, biocides, and metal chelators.

9. The ink of claim 1, having a visible light absorbance of 0.01 to 0.57 at lambda$_{max}$ and at a 1:10,000 dilution in water.

10. A method for ink-jet printing, comprising:

providing at least one magenta ink containing at least one water-soluble magenta dye having a visible light absorbance of 0.01 to 0.57 at lambda$_{max}$ at a 1:10,000 dilution in water and having a structure as follows:

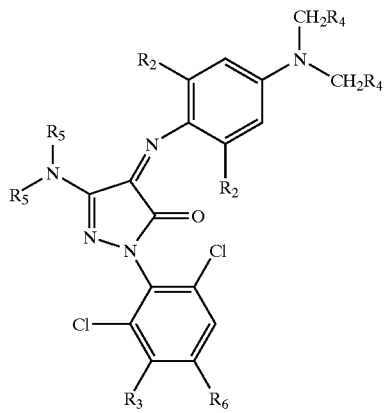

wherein R2 is selected from the group consisting of methyl, ethyl, propyl, isopropyl and halogen;

R3 is selected from the group consisting of SO$_3$H, COOH, and a polyether group

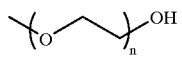

where n is from 2 to 100;

R4 is selected from the group consisting of H, SO$_3$H, COOH, CH$_2$SO$_3$H, CH$_2$COOH, C$_2$H$_4$SO$_3$H and C$_2$H$_4$COOH;

R5 is selected from the group consisting of ethyl, propyl, isopropyl, phenyl, substituted phenyl, and R4; and R6 is selected from the group consisting of H, halogen, methyl, amino, substituted amino, R4 and R3; and printing said ink on a printing medium by means of an ink-jet pen.

11. The method according to claim 10, wherein the structure of the water-soluble magenta dye is as follows:

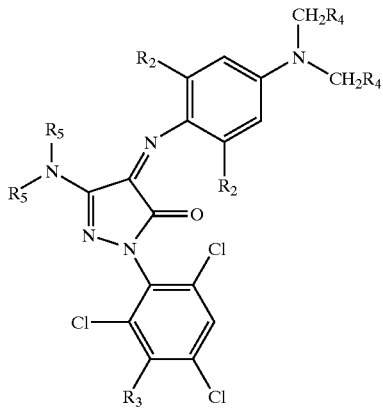

wherein R2 is selected from the group consisting of methyl, ethyl, propyl, isopropyl and halogen;

R3 is selected from the group consisting of SO$_3$H, COOH, and a polyether group

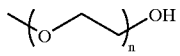

where n is from 2 to 100;

R4 is selected from the group consisting of H, SO$_3$H, COOH, CH$_2$SO$_3$H, CH$_2$COOH, C$_2$H$_4$SO$_3$H and C$_2$H$_4$COOH; and R5 is selected from the group consisting of ethyl, propyl, isopropyl, phenyl, substituted phenyl, and R4.

12. The method according to claim 10, wherein the structure of the water-soluble magenta dye is as follows:

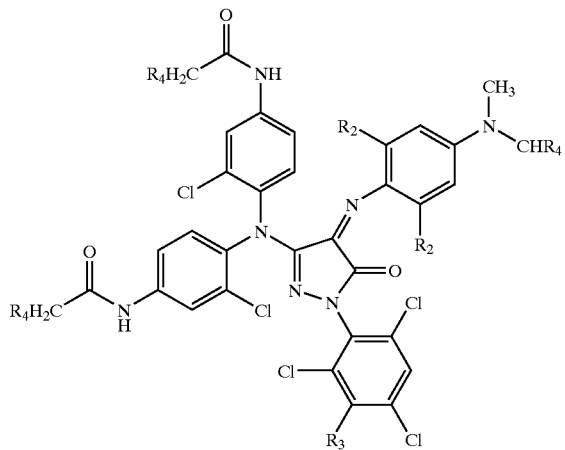

wherein R2 is selected from the group consisting of methyl, ethyl, propyl, isopropyl and halogen;

R3 is selected from the group consisting of SO$_3$H, COOH, and a polyether group

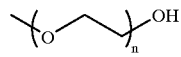

where n is from 2 to 100; and

R4 is selected from the group consisting of SO$_3$H, COOH, CH$_2$SO$_3$H, CH$_2$COOH, C$_2$H$_4$SO$_3$H and C$_2$H$_4$COOH.

13. The method according to claim 10, wherein the structure of the water-soluble magenta dye is as follows:

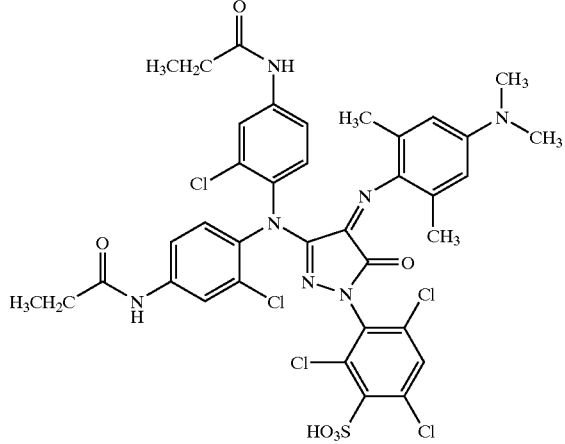

* * * * *

UNITED STATES PATENT AND TRADEMARK OFFICE
CERTIFICATE OF CORRECTION

PATENT NO.    : 6,730,151 B2
DATED         : May 4, 2004
INVENTOR(S)   : Deardurff It is certified that error appears in the above-identified patent and that said Letters Patent is hereby corrected as shown below:

Column 22,
Line 8, delete "$CHR_4$" and insert -- $CH_2R_4$ --.

Signed and Sealed this

Nineteenth Day of April, 2005

JON W. DUDAS
*Director of the United States Patent and Trademark Office*